March 28, 1961     C. ADAMSON ET AL     2,977,510
PROTECTION OF ELECTRICAL POWER CIRCUITS
Filed Sept. 9, 1957     4 Sheets-Sheet 3

March 28, 1961  C. ADAMSON ET AL  2,977,510
PROTECTION OF ELECTRICAL POWER CIRCUITS
Filed Sept. 9, 1957  4 Sheets-Sheet 4

United States Patent Office 2,977,510
Patented Mar. 28, 1961

2,977,510

PROTECTION OF ELECTRICAL POWER CIRCUITS

Colin Adamson and Jack Leonard Dineley, Manchester, England, assignors to The English Electric Company Limited, London, England, a British company Filed Sept. 9, 1957, Ser. No. 682,736

10 Claims. (Cl. 317—36)

This invention relates to the protection of electrical power circuits.

An object of the invention is to provide an improved electrical relay arrangement for the protection of electrical power circuits in which the operating time of the relay is predetermined. In one of its aspects the invention finds application where an inverse time-overcurrent or inverse time-overvoltage characteristic is required. Another aspect relates to a relay system in which the relay must operate in a definite time.

According to the invention, an electrical power circuit time-overcurrent protection system comprises, in combination, a protected alternating current circuit, a circuit interrupter connected in said circuit, relay means connected to trip the circuit interrupter according to the condition of an electrical operating element forming part of said relay means, a D.C. power supply source, a time-delay circuit energized through a rectifier from the alternating current circuit, a transistor having collector-emitter and base-emitter circuits connected to be energized respectively from the D.C. power supply source and said time-delay circuit, said time-delay circuit including a resistor-capacitor combination of which the capacitor is charged through the resistor to provide a voltage output signal which is applied to control the base-emitter circuit to govern the state of the transistor in delayed response to changes in the energization of the time-delay circuit, and said electrical operating element being connected in an emitter circuit common to said collector-emitter and base-emitter circuits to be conditioned to trip the circuit interrupter in direct response to the emitter current, whereby to increase the input impedance of the base-emitter circuit and thereby prolong the time-delay provided by the resistor-capacitor combination.

Various aspects of the invention relate to the nature of the means used to produce the delayed response, a difficulty here being the obtaining of a sufficiently long time delay, and means which may be adopted to modify the relationship of the operating time to the current or voltage condition, a difficulty here being the obtaining of specific relay operating characteristics such as a characteristic roughly according to the law $K=I^n t$ where K is a constant, I is current, $t$ is operating time and $n$ is a constant which may be as great as 30. $n$ is zero in one form of relay falling within the scope of the invention. For such a relay $t=K$; the operating time is constant at all currents.

These and other aspects of the invention and various embodiments thereof will now be described with reference to the accompanying drawings in which.

An improvement afforded by an electrical protective relay device according to this invention arises from the use of the semi-conductor device known as the junction transistor. There is a trend in the relay art to replace electromagnetic relay devices by devices which are essentially static in their operation in that they have no moving parts. Reliability, ease of maintenance and long life, are amongst the factors which require careful consideration when choosing between transductor and electronic devices as static relay components. Each such device has its advantages and disadvantages and the choice must needs depend upon the extent to which the disadvantages can be overcome, a task which requires both ingenuity and skilful design.

The particular advantages which arise from the use of transistors in relay devices in comparison with thermionic valves may be summarized as follows:

(a) No heater supplies are required.

(b) Only small high tension supply voltages are required.

(c) The transistor is a very rugged device and as it is usually soldered directly into a circuit it is much less susceptible to mechanical shock than a thermionic valve mounted in a conventional valve holder.

(d) Transistors have a working life which is generally recognized as being many times greater than that of a thermionic valve.

(e) The present very active development of transistors promises to improve their characteristics, reliability, and working capacities, so that transistors are constantly gaining way in these respects relative to the thermionic valve.

The disadvantages of transistors may be summarized as follows:

(a) Transistors are temperature sensitive; their gain increases with temperature.

(b) A germanium transistor passes a small current even without any control signal, so that a circuit including it must be designed to provide a current bias to prevent circuit instability.

(c) The reverse voltage that can be withstood by a transistor is quite small.

(d) A transistor is essentially a current operated device and the germanium junction transistors at present available can only handle currents which are infinitesimal compared with the current normally used in electrical power system applications. This is an obstacle to any attempt to directly transistorize a conventional protective relay system as many problems which do not present themselves in circuits dealing with currents measured in milliamps may become important where the current is measured in microamps.

Figure 1:
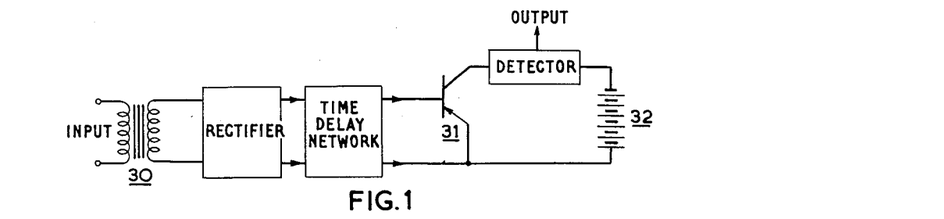
Fig. 1 shows in schematic form a typical relay of a kind which may embody the invention with advantage.

In Fig. 1 a schematic relay arrangement is shown to comprise a transformer 30 whose output is fed to a circuit comprising a rectifier, a time delay network and a transistor 31. An input signal supplied to the primary winding of the transformer 30 is therefore transformed, rectified and subjected to a time delay before being supplied as input to the base of the transistor 31. This transistor has a grounded emitter and includes in its output circuit, that is, in its collector circuit, a load device, in the form of a detector. The output circuit of the transistor is energized from an H.T. supply comprising a battery 32.

In operation, when this relay arrangement is used to protect an electrical circuit, the input signal supplied to the transformer 30 may be a voltage signal or a current signal and the control signal supplied to the transistor is a rectified time-delayed version of the A.C. input signal. The function of the detector in the output circuit of the transistor is to detect when this control signal reaches a predetermined magnitude and upon detecting such a condition to provide output information which may be applied to protect the circuit from which the input signal is derived.

Figure 2:
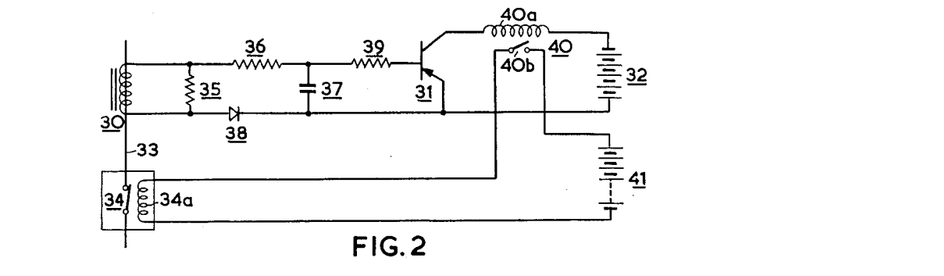
Fig. 2 shows one particular embodiment of Fig. 1 and illustrates the use of a resistor-capacitor network as the timing element.

Depending upon the application of the relay arrangement of Fig. 1 the transformer 30 may be a voltage transformer, a current transformer, or a transactor. It is to be noted that a transactor is a transformer reactor, which is a transformer having an air gap in its magnetic core so that it may transform a current input signal into a voltage output signal. In the most likely application of the relay arrangement the transformer 30 will be a current transformer and will be used in an electrical power circuit protection system having a time overcurrent or earth fault characteristic. Such a system is required to perform a protection function in a time which is an inverse function of the overload or earth fault current. A simple system of this kind is shown in Fig. 2. Here a line 33 forming part of the protected circuit includes a circuit breaker 34 which is shown to be in the closed position in the figure. The current transformer 30 is energized by current in the line 33 and has a resistor 35 connected across its secondary winding. This resistor 35 provides a load for the current transformer and has a potential drop across it which is proportional to the current in the line. A time delay network comprising resistor 36 and capacitor 37 is connected across the resistor 35 and a rectifier 38 is incorporated in this connection as shown. The voltage across the capacitor 37 is therefore a D.C. voltage which is determined by the potential drop across the resistor 35, though related to it by a time delay.

The connection of the rectifier 38 is such that the capacitor 37 acquires a negative charge with respect to the positive terminal of the battery 32. The capacitor 37 is connected to the base of the transistor 31 through a blocking resistor 39. Consequently the accumulation of negative charge on the capacitor 37 renders transistor 31 more conductive as its base is carried negative with respect to the emitter. This allows a greater collector current to flow through the detector, which in Fig. 2 is shown to comprise a slave relay 40, the operating coil 40a of the relay being connected in the collector circuit of the transistor. When sufficient current flows through coil 40a the relay contacts 40b close and complete a circuit through the circuit breaker trip coil 34a from a further battery 41. Thus, in operation, when the current in the line 33 increases the negative charge of capacitor 37 increases and the transistor 31 carries more current until relay 40 operates to promote tripping of the circuit breaker 34 and so de-energize the line 33. This operation is subject to the inherent time delay characteristics of the system which are determined mainly by the values of resistor 36, capacitor 37 and the load imposed across capacitor 37 by resistor 39 and the input impedance of transistor 31. The time delay causes the operating characteristic of the relay to be an inverse relationship between operating time and overload current in the protected circuit; the greater the current in the line, the shorter the operating time of the relay, and the smaller this current the longer the operating time.

It is to be understood that whereas in Fig. 2 the detector is shown to be a coil operated contact system this detector may in practice comprise a transistor device, a transductor device, an electronic device, etc. Furthermore the time delay network may have a variety of forms and may utilize reactive elements other than capacitors, though it is to be noted that the use of a capacitor as a timing element is much preferred.

Apart from such modifications of the circuit shown in Fig. 1 the basic arrangements shown both in Figs. 1 and 2 are capable of extensive improvement. The arrangements suffer from inherent disadvantages of the transistor as already summarized and other disadvantages which arise particularly in the relay applications under consideration.

Firstly, certain disadvantages arise from the use of a blocking resistor such as the resistor 39 in Fig. 2. The input impedance of the base-emitter circuit of the transistor 31 shown in the configuration of Fig. 2 is quite low, being about 15 ohms in a typical case, and a blocking resistor 39 having a resistance of the order of about 100,000 ohms is necessary to prevent a too rapid discharge of the capacitor 37. However, from the point of view of the transistor characteristics it is extremely desirable to eliminate this blocking resistor because the inherent behaviour of the transistor provides a definite relationship between the base current and the current in the collector emitter circuit. For a given current in the detector shown in Fig. 1 a definite base current must flow. The presence of a large blocking resistor in the base circuit therefore requires a large potential drop across the blocking resistor. This is a condition which, for an appreciable time delayed response of the time delay network, requires that the reactance of this network should be extremely large because the network has to supply a considerable output energy and this must be small relative to the network's capacity to store energy.

It is in accordance with a feature of this invention to provide that an electrical operating element of the relay means is connected to the transistor to be common to both the collector-emitter and base-emitter circuits. The effect of this is to cause the input impedance of the transistor to become approximately equal to the impedance of the detector as multiplied by the gain factor of the transistor. This arrangement therefore assists in preventing the too rapid discharge of the capacitor used in the time delay network and enables the blocking resistor in the transistor base circuit to be eliminated.

Figure 3:
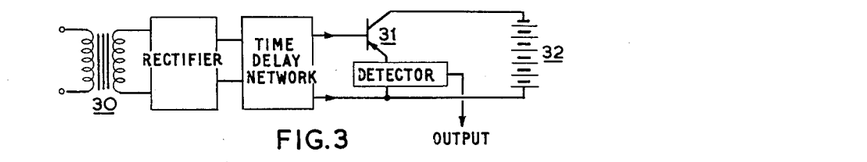
Fig. 3 shows a modification of Fig. 1.

Thus, in Fig. 3, the schematic arrangement of Fig. 1 is modified by the transfer of the detector from the collector circuit of the transistor to the emitter circuit of the transistor. In operation, if the impedance of the detector can be represented by a resistance R and a voltage V is applied to the base of the transistor, then assuming a constant H.T. supply, a current $V/R$ will flow in the emitter circuit and, if the current gain of the transistor is $g$ the corresponding current in the base circuit is $V/Rg$. Consequently, the input impedance of the transistor base-emitter circuit is $Rg$. In practice $g$ may be of the order of 50 and R may be 2,000 ohms, so that there will be the equivalent of 100,000 ohms resistance as a load across the capacitor. This resistance may replace the blocking resistor 39 of Fig. 2.

The problem of the large potential drop across the blocking resistor to provide the base current does not arise in Fig. 3 and consequently the capacitor need not be so large to obtain a given time delay. However, this time delay has now become dependent upon the gain factor of the transistor but fortunately as may be shown analytically the dependence is small and the relay operating characteristics need not be unduly affected by the temperature sensitivity of the transistor.

The next disadvantage to consider arises in all the arrangements shown in Figs. 1, 2 and 3. The emitter-follower configuration shown in Fig. 3, like the grounded emitter configuration shown in Figs. 1 and 2, gives some output current for all voltage levels of the transistor base input. The relay operating level, that is the voltage supplied to the transistor base which causes relay operation, is therefore dependent upon the setting of the detector. In many forms of detector the setting is not closely controlled and it becomes preferable in such cases to modify the transistor circuit configuration so that relay performance is not too dependent upon the detector characteristics.

It is, therefore, in accordance with another feature of this invention to provide as part of the protection system a trigger circuit which is connected between said transistor and the relay means whereby the operating magnitude of said current is determined by the setting of the trigger circuit rather than the characteristics of said relay means.

Figure 4:
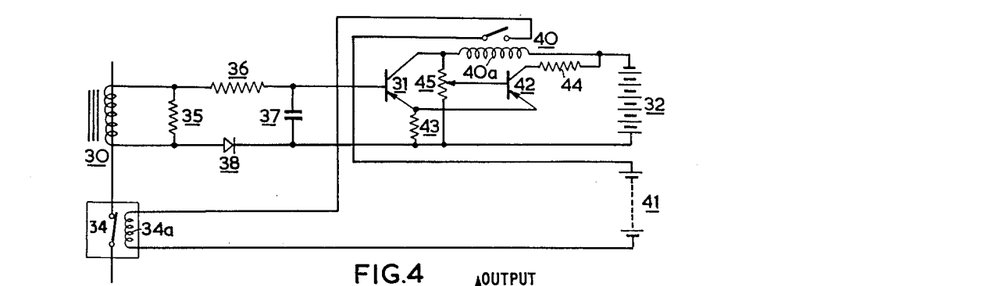
Fig. 4 shows the use of a trigger circuit in a modification of Fig. 2.

In Fig. 4 the arrangement shown in Fig. 2 is modified by the inclusion of a trigger circuit. The output voltage from the capacitor 37 is applied directly to the base of transistor 31. This transistor has its emitter connected directly to the emitter of another transistor 42 and this common emitter connection is grounded through a biasing resistor 43. As in Fig. 2 a slave relay 40 has its operating coil 40a connected in the collector circuit of transistor 31. A resistor 44 is connected in the collector circuit of the transistor 42. The base of transistor 42 is supplied from a tapping on a potentiometer 45 which connects the collector of transistor 31 to the positive H.T. terminal of battery 32.

The operation of the $a$-stable trigger circuit formed by the transistors 31 and 42 will now be described. With no voltage on the base of the relay operating transistor 31 this transistor is non-conductive, or may be regarded as non-conductive for the purpose of this description. The potential drop across potentiometer 45 is therefore quite large, the resistance of this potentiometer being greater than that of the coil 40a. The tapping voltage from this potentiometer causes transistor 42 to be conductive which in turn establishes a bias voltage across resistor 43 and assures that the transistor 31 is in fact non-conductive. The voltage developed across this common emitter bias resistor 43 is the trigger voltage level of the system and this trigger voltage is the product of the resistance of resistor 43 and the current flowing through the collector emitter circuit of transistor 42 under the conditions just considered. Some variation of the trigger level can be achieved by varying the setting of the potentiometer tapping on 45. As soon as the voltage applied to the base of transistor 31 exceeds the trigger voltage, base current flows in transistor 31 and the collector emitter circuit of this transistor becomes conductive with the result that a relatively large potential drop is established across the relay operating coil 40a. This reduces the potential drop across potentiometer 45 and has the effect of rendering transistor 42 less conductive. This, in turn, reduces the bias voltage produced across resistor 43 and leads to a regenerative action in as much as current in transistor 31 will increase as current in transistor 42 decreases and the latter is a consequence of the former. The circuit becomes finally stable with transistor 31 conducting and a large current flowing through operating coil 40a of the slave relay 40. The relay 40 therefore operates a very short time after the trigger voltage level is reached by the voltage across capacitor 37. In a practical embodiment of the circuit shown in Fig. 4 the trigger time has been measured and found to be as small as 7 microseconds.

Trigger circuitry of the kind just considered achieves independence of the characteristics of the transistors but the bias voltage across resistor 43 and hence the trigger voltage level is dependent upon the voltage of the battery 32. This disadvantage may be overcome by stabilising the H.T. voltage source.

The circuit shown in Fig. 4 retains the detector (that is, the slave relay) in the collector of the relay operating transistor and although not suffering from the full disadvantages arising from the very low input impedance of transistor 31 this low input impedance does nevertheless result in the production of a hesitation in final triggering on occasions.

Figure 5:
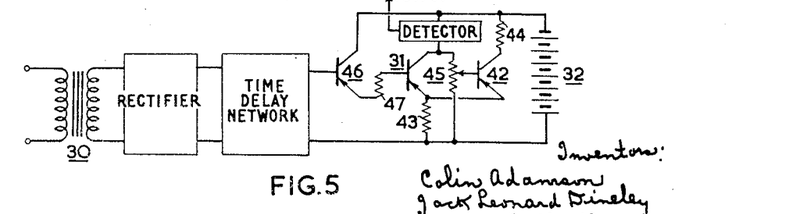
Fig. 5 shows the use of the same trigger circuit as Fig. 4, with a modified infeed.

To remedy this it is in accordance with yet another feature of this invention to provide an emitter-follower transistor stage between the time-delay means and the base-emitter circuit of the transistor. Such an arrangement is shown in Fig. 5, the relay 40 being represented more schematically as a detector. The emitter-follower stage simply comprises a transistor 46 whose base-emitter circuit includes on the emitter side a resistor 47, the circuit being connected in the base circuit of transistor 31. The collector of transistor 46 is connected directly to the negative H.T. terminal of battery 32. In operation, the arrangement shown in Fig. 5 is similar to that shown in Fig. 4 the function of the emitter-follower being merely to increase the input impedance to transistor 31.

Figure 6:
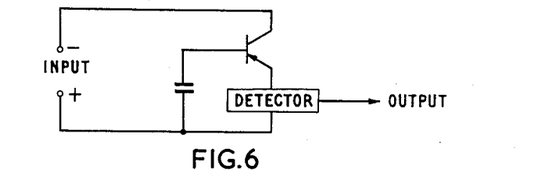
Fig. 6 shows a simple circuit in which the relay operating transistor is energized from the input.

In research on relay devices of the kind under consideration, it was found that a basic relay circuit comprising a capacitor-transistor-detector load combination as shown in Fig. 6 operated with a zero input voltage signal when the H.T. supply was applied. This arises from a disadvantage of the germanium transistor already summarized, the capacity of the transistor to pass a small current even without any control signal. Such a current is able to charge the capacitor shown in Fig. 6 with the result that a cumulative effect occurs until the detector responds and the relay is operated. This disadvantage may be remedied by the use of a starting device which keeps the capacitor short-circuited until the system current reaches the necessary value. Such a short-circuiting action can also be applied to reset the relay device if reset can occur solely in response to the input signal to the relay operating transistor.

Preferably the starting and resetting device has the form of a transistor stage.

According to yet another feature of the invention, the protection system includes means for short-circuiting the capacitor in order to control the onset of a time-delay before relay operation and/or to facilitate the re-setting of the system after relay operation. These short-circuiting means may comprise a transistor which has its collector-emitter circuit connected across the capacitor whereby to discharge or prevent the build-up of charge on the capacitor when its base-emitter circuit is suitably energized. Preferably, the base-emitter circuit of the short-circuiting transistor includes voltage-biasing means and is connected to be energized through the rectifier from the alternating current circuit in a manner which assures that the capacitor cannot become charged unless the energizing signal derived from the alternating current circuit exceeds a predetermined level.

Figure 7:
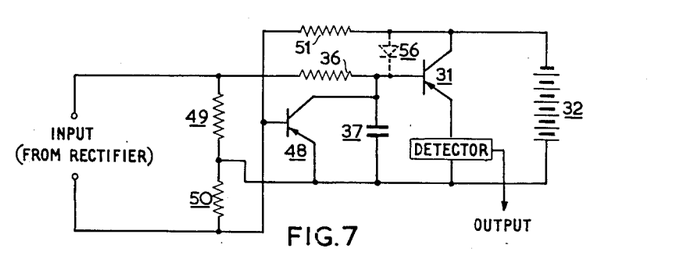
Fig. 7 shows a modification of Fig. 3 which provides starting and resetting action.

Such an arrangement is shown in Fig. 7. The circuit shown in Fig. 7 corresponds to the circuit of Fig. 3, beginning with the output from the rectifier. The main modification consists in the provision of an additional transistor 48 which has a grounded emitter and a collector connected to the base terminal of a capacitor 37 which forms part of a time delay network comprising this capacitor and the resistor 36. The input from the rectifier is applied across two resistors 49 and 50 connected in series. The potential drop across resistor 49 is applied to the time delay network and the ungrounded connection of resistor 50 is connected through a further resistor 51 to the negative H.T. terminal of battery 32. In operation, with zero input signal from the rectifier, the voltage at the base of transistor 48 is held negative owing to the potential division arising from the connection of this base to the junction of a resistor 50 and 51 which are energized directly from the full negative battery H.T. As the base of transistor 48 is negative the transistor is conductive and this prevents the build up of voltage across capacitor 37. When a sufficiently large negative input signal is supplied as output from the rectifier the current in resistor 50 changes direction with the result that the base of transistor 48 now becomes positive causing transistor 48 to become non-conductive. This allows capacitor 37 to charge with the appropriate time delay to a voltage determined by the input from the rectifier. The circuit shown in Fig. 7 also ensures automatic resetting action since as soon as the input voltage from the rectifier falls to zero transistor 48 becomes conductive and so discharges the capacitor 37.

It is desirable to protect a germanium transistor from excessive voltages. This requies that the maximum collector H.T. negative supply should be limited to a safe value. Also, it requires that the potential applied to the base of the transistor should be similarly limited. The former requirement is readily satisfied by providing some suitable voltage stabilizing circuit in the H.T. supply line. This is not necessary if a battery supply as indicated in Figs. 1, 2, 3, 4, 5 and 7 is used, but it may be required to energize the transistors from the same source as that supplying the input control signal, that is, for example, the current transformers 30 of Figs. 2 and 4. In such a case the requirement that the relay should respond to prolonged overloads of small amplitude as well as short-duration overloads of large amplitude gives rise to the need for over-voltage protection and the H.T. supplies may then be derived from a circuit such as that shown in Fig. 8. Here a D.C. voltage proportional to the input signal to the circuit is fed through a network comprising non-linear resistors 52 and 53 and linear resistors 54 and 55 before being rectified and applied as an H.T. source. The resistor network has an input voltage applied across a linear resistor and a non-linear resistor connected in series and supplies an output voltage to a similar series circuit from the non-linear resistor. As a result, owing to the fall of resistance of the non-linear resistors, with increasing current through them the voltage across them is only slightly sensitive to changes of the main voltage input and a fairly stabilized H.T. output voltage is obtained from the network.

The requirement to protect the base of the transistor from over voltages may be met by connecting a germanium diode between the base and the collector in such a fashion that when the base potential exceeds that of the collector the signal current is diverted to the collector H.T. circuit. This form of protection is not required if a large resistance is included in the base circuit as is the case for example in the circuit shown in Fig. 2. The protecting diode is shown in broken lines in Fig. 7 at 56.

The aspects of the invention considered above relate to the problem of overcoming difficulties arising from inherent disadvantages of the transistor.

The aspects of the invention to be considered next relate to the operating characteristics of the relay.

The operating characteristics of the relay system shown in Figs. 2, 4 and 7 are of the form $It=K$, where K is a constant. This characteristic applies over a definite range, limited by the relay setting, and above this range the operating time would tend to become exponential to infinity with increase of the relay setting. Whichever form of relay system so far described is used, the system can be regarded as functioning as a voltage level detector which responds to the output from a time delay network to promote relay operation as soon as the output signal from the time delay network reaches the necessary voltage level.

In the systems utilising the capacitor 37 the voltage across the capacitor would probably be somewhere in the range of 7–15 volts to promote relay operation. This trigger voltage is quite large and ensures that the transistor characteristics and load conditions have little effect upon the form of relay characteristic. The truly inverse characteristic is, however, modified when the operating time becomes very short. This is because of time delays in the system that are independent of the time delay network incorporating capacitor 37. For example, if the detector in the output circuit of the transistor has a significant operating time, this will add a small constant time increment to the operating time of the whole relay system. The over-all relay operating characteristic will therefore be modified in this respect.

It falls within the scope of this invention to provide means for modifying the basic form of the relay characteristics. Required modifications comprise:

(i) A modification of the basic time-overcurrent characteristc to $I^n t=K$, where K is a constant and $n$ has a value larger than unity, (ii) A modification necessary to produce a relay with a definite minimum operating time, (iii) A modification necessary to produce a relay having instantaneous high-set operation, and (iv) A modification necessary to give the relay a characteristic having a constant time increment added to the basic inverse operating time.

These various modifications will now be described in detail.

According to a feature of the invention, in said protection system the time-delay circuit includes a reactive impedance element and a non-linear resistive element, the circuit being such that its output signal is a non-linear time-delayed function of the input signal.

Figure 9:
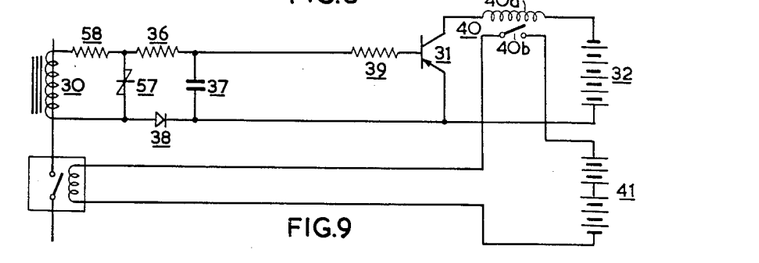
Fig. 9 shows the use of non-linear resistors to modify the relay characteristics.

The non-linear resistive element may, for example, be a silicon carbide resistor. Such a resistor has the voltage across it related to its current by an equation of the form $V=KI^m$, where V is the voltage across the resistor, I is the current flowing through the resistor, K is a constant, and $m$ has a value between about 0.12 and 1.0, depending upon the proportion of graphite filler included with the silicon carbide and ceramic binder in the manufacture of the resistor. Fig. 9 shows how such resistors may be used in the relay system shown in Fig. 2 to modify the over-all relay operating characteristic so as to render this characteristic very much more inverse than it would otherwise be.

Referring to Fig. 9 the circuit shown in Fig. 2 is reproduced exactly, apart from the replacement of resistor 35, by a non-linear resistor 57 and the addition of a further resistor 58 in series with the secondary winding of transformer 30. In operation, the non-linear resistor 57 acts as a shunt path across the capacitor 37 so that low voltages can be built up across the capacitor relatively quickly but, as the impedance of the shunt path across the capacitor decreases rapidly with increasing capacitor voltage, high voltages on the capacitor take a relatively longer time to build up with the result that the relay system has a less inverse time-overcurrent operating characteristic.

Whereas the inherent time delay introduced elsewhere in the system, e.g. at the detector, may endow the circuit with an approximately definite minimum time operating characteristic, it may be desirable to render the system independent of these latter time delays. In cases where a high speed detector can be used non-linear circuitry can be applied to obtain the definite minimum time characteristic but in general this is not to be preferred because it is difficult to obtain a sharp limiting characteristic having a constant definite minimum operating time.

Figure 10:
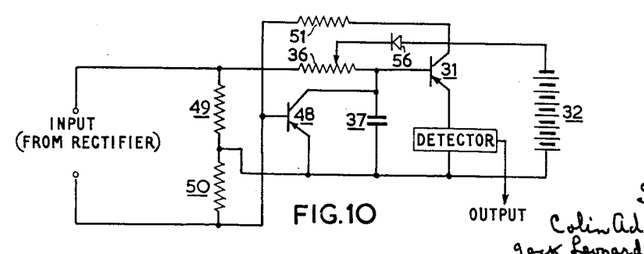
Fig. 10 shows a modification of Fig. 7 to provide a definite minimum time operation.

It is in accordance with another feature of the invention to include in the relay device provision for definite minimum time operation by means comprising a protecting diode which is connected between the base circuit and the collector circuit of the relay operating transistor, the connection in the base circuit of the transistor being made to a point in the time delay network. Thus, as shown in Fig. 10, which is a modification of Fig. 7, the protecting diode 56 is shown to be connected between the collector transistor 31 and a point part way along the charging resistor 36. In operation, the voltage at this point of connection along the resistor 36 is limited to the H.T. negative supply voltage, plus a small potential drop in the diode 56. Thus, when a high signal input is applied to the system the charging time of capacitor 37 is principally determined by the H.T. supply voltage plus the potential drop in diode 56. This gives the relay system a substantially constant operating time on high input signals and so produces the necessary operating characteristic.

Figure 11:
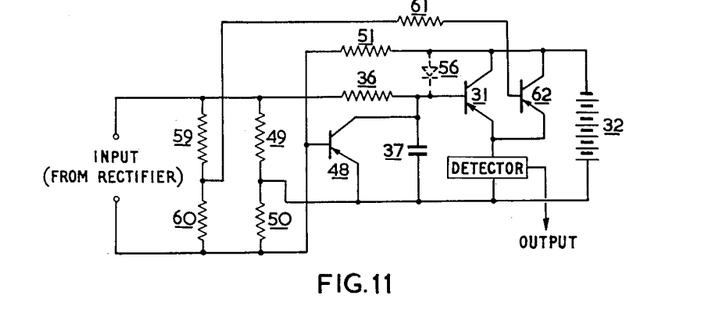
Fig. 11 shows a modification of Fig. 7 to provide an instantaneous high-set feature.

If it is required to provide the relay device with an instantaneous high-set feature, this feature may be obtained by adding a separate transistor stage to the system. This separate transistor stage could be controlled in accordance with an output signal derived directly from the rectifier shown in Fig. 1 and the output circuit of the transistor could be arranged to energize the detector directly. In Fig. 11 this modification is shown to be applied to the circuit of Fig. 7. The modification consists in the provision of a potentiometer comprising two resistors 59 and 60 energized by the input from the rectifier. The common connection of these resistors is connected through a blocking resistor 61 to the base of a transistor 62 whose collector is connected to the negative H.T. supply and whose emitter is connected to the detector as shown. The setting of this by-pass transistor stage is higher than that of the remainder of the circuit. Thus, in operation, if the input signal reaches a certain value the operation of the circuit is not determined by the time delay network and the detector is energized instantaneously without time delay to promote relay operation. The setting of this instantaneous high-set circuit is determined by the resistors 59 and 60. These resistors would, in practice, probably be replaced by a potentiometer having a movable tapping to provide means for adjusting the instantaneous setting.

Figure 12:
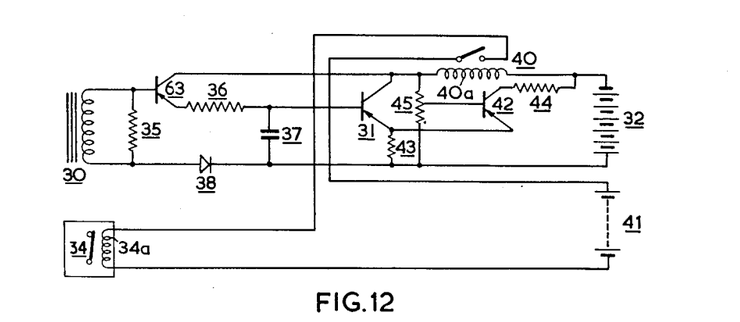
Fig. 12 shows a modification of Fig. 4 to provide a relay having a definite operating time.

One modification provided by this invention gives the relay a definite time characteristic. Such a relay is shown in Fig. 12. Referring to this figure, the time delay network of Fig. 4, for example, is shown to be modified by the inclusion of a further transistor 63. This transistor 63 functions in much the same manner as the diode 56 of Fig. 10. For normal and high input signals the transistor 63 becomes fully conductive, allowing capacitor 37 to charge up at a rate governed by the H.T. supply. This results in constant operating time of the relay as the voltage of the H.T. supply is constant. For low input signals the transistor 63 functions as an emitter follower and the operating time of the relay has the normal inverse characteristic.

A further modification provided by this invention gives the relay a characteristic in which a constant time increment is added to the normal inverse time characteristic. This provides a form of relay not previously available which seems to be admirably suited to applications on time-graded systems. The first and most rapid acting relay in such a system can be said to have a basic characteristic without the definite minimum time feature. If fault level attenuation is insufficient to permit the use of a second stage without definite minimum time then a modification by which a suitable constant time increment may be added to the operating characteristic of the relay can be used. The embodiment of the relay shown in Fig. 12 may be modified to utilise this feature by providing an intermediate resistor-capacitor stage between the output from resistor 35 and the base of transistor 63. The capacitor would be connected between the base of the transistor and the positive supply line from the battery 32 and the resistor would be connected between the appropriate end of resistor 35 and the base of transistor 63. When this resistor-capacitor stage is used the relay has a characteristic in which a constant time increment is added to the normal inverse operating time characteristic of the relay.

Figure 8:
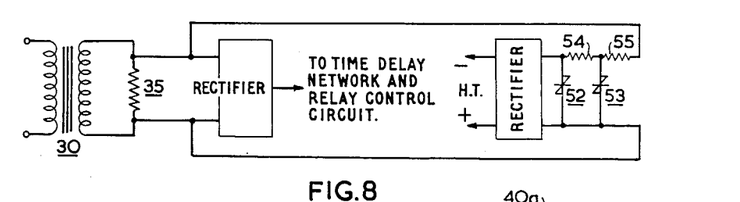
Fig. 8 shows a schematic arrangement in which the H.T. supply is derived from the relay input.
Figure 13:
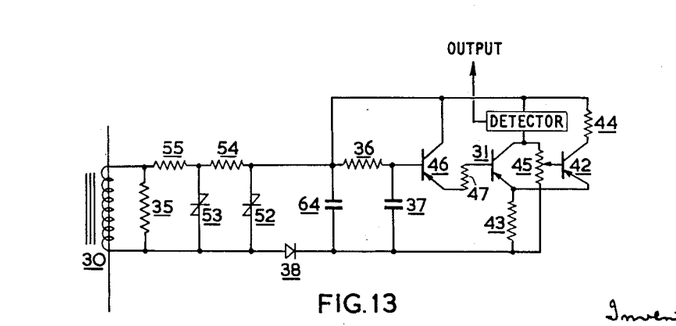
Fig. 13 shows a modification of Figs. 5 and 8 to provide a relay having a definite operating time.

It is in accordance with yet another feature of the invention to provide a definite time delay relay by modifying the circuit of the general form shown in Fig. 5 so that the H.T. supply is derived from the transformer 30, as indicated in Fig. 8. Such a modification is shown in Fig. 13. Here, the non-linear resistive network comprising linear resistors 54 and 55 and non-linear resistors 52 and 53 is shown to be energized by the voltage input signal derived from transformer 30 and the output from the network, after rectification by the half-wave rectifier 38, is smoothed by a reservoir capacitor 64 and applied as input to a circuit comprising the time delay network and the trigger circuit shown in Fig. 5. However, in this case the H.T. supply from the transistor circuit is also derived from the potential drop across capacitor 64. The non-linear network in the input stages of the circuit operates to provide a substantially steady input signal over a wide range of line current variation. The relay circuit of Fig. 5 has become, in effect, a time-overcurrent relay that is energized and controlled by a stabilized current signal. As a result, the relay tends to operate at a definite time after the overload condition occurs. This relay has been found to have a very good operating characteristic, the operating time being substantially constant over an input signal range of as much as 20 or more. The reason for this is that slight variations in the potential drop across capacitor 64 causes the transistor high tension supply and the transistor base control signals to vary in unison and, accordingly, by a suitable bias setting of the trigger circuit it becomes possible to provide some compensation for variations of the potential drop across capacitor 64.

It is, therefore, in accordance with a feature of the invention to use a time-overcurrent relay of the form already described and include as an input stage a non-linear circuit which operates to stabilize the input signal to the time-overcurrent relay, said control signal also forming the energizing H.T. supply of the relay, whereby the relay operates as a definite time delay relay.

Figure 14:
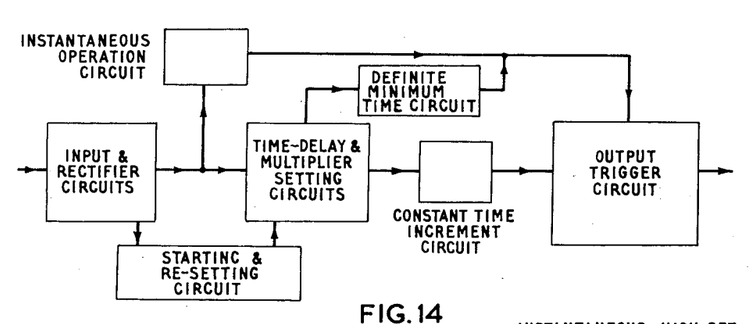
Fig. 14 shows schematically a full circuit arrangement of the relay device incorporating several of the features shown in previous figures.

As the invention has so far been described several features have been considered in turn without a full correlation of them in a combined relay device. By way of example, one such combined arrangement of a relay will now be described with reference to Figs. 14 and 15. Fig. 14 merely shows in very schematic form the relationship of the various component circuits of the more detailed arrangement shown in Fig. 15.

Referring to Fig. 14, a relay arrangement is shown to comprise the basic time-overcurrent relay having an output trigger circuit and including provision for starting and re-setting, instantaneous high-set operation, definite minimum time operation, and the constant time increment feature just described. In the main, Fig. 14 is self-explanatory and may be well understood in the light of the foregoing considerations.

Figure 15:
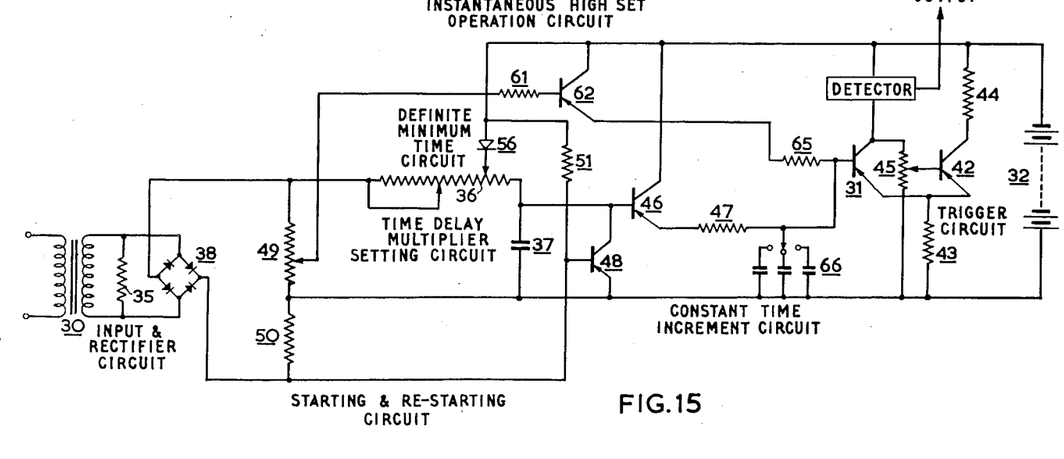
Fig. 15 shows in more detail circuitry appropriate to the schematic arrangement shown in Fig. 14.

The embodiment shown in Fig. 15 consists essentially of a combination of Figs. 5 and 7. Corresponding circuit components are therefore denoted by the same reference numerals as are used in these figures. The input and rectifier circuit is now shown to comprise a current transformer 30 having a load resistor 35 and the output from this load resistor is fed, in this case, through a full-wave bridge rectifier 38. Provision for the smoothing of this output voltage is not necessary if a full-wave bridge rectifier is used.

The instantaneous high-set operation circuit shown in Fig. 11 is incorporated in the circuit of Fig. 15 by regarding the resistor 49 as the potentiometer formed by resistors 59 and 60 in Fig. 11. Resistor 49 is, therefore, a potentiometer having a movable tapping whose position determines the setting of the instantaneous high-set operation circuit and the output from this tapping is supplied to the resistor 61 in the base circuit of a transistor 62. The collector of transistor 62 is energized from this negative H.T. supply and the emitter is connected through a resistor 65 to the base of transistor 31 in the trigger circuit. Transistor 62 therefore functions as the emitter follower 46 but with regard solely to the instantaneous operation feature. The definite minimum time circuit of Fig. 10 is incorporated in Fig. 15 by arranging that a diode 56 can be connected at various positions along the capacitor charging resistor 36. The constant time increment circuit described as a modification of Fig. 12 is incorporated in Fig. 15 as part of the emitter follower stage in the input to the trigger circuit. Thus, transistor 46 in Fig. 15 functions as transistor 63 in Fig. 12 and resistor 47 and capacitor bank 66 are the elements which determine the constant time increment added to the normal time delay of the circuit comprising resistor 36 and capacitor 37. The full operation of the circuit shown in Fig. 15 will be understood from the description already given of the operations of the various circuit components. In a practical embodiment of the invention means are required for adjusting the setting of the relay and these may comprise switching arrangements in which resistor 36 comprises a bank of resistors and capacitor 37 may similarly comprise a bank of capacitors all having different values and there being special switching means for selecting the appropriate time delay characteristic. Provision for such an adjustment is indicated schematically by the movable tapping arranged to short circuit part of resistor 36 in Fig. 15. The other movable tapping on resistor 36 allows an adjustment of the definite minimum time setting of the relay whilst the tappings on resistor 49 and capacitor bank 66 respectively are associated with the setting of the instantaneous high-set characteristic and the constant time increment. Besides this, there is the movable tapping on resistor 45 which allows the trigger voltage level of the trigger circuit to be adjusted if required. It will be understood that resistor 36 may comprise a resistor network incorporating non-linear resistors in order to provide a relay operating characteristic which is very inverse.

What we claim as our invention and desire to secure as Letters Patent is:

1. An electrical power circuit time-overcurrent protection system comprising, in combination, a protected alternating current circuit, a circuit interrupter connected in said circuit, relay means connected to trip the circuit interrupter according to the condition of an electrical operating element forming part of said relay means, a D.C. power supply source, a time-delay circuit energized through a rectifier from the alternating current circuit, a transistor having collector-emitter and base-emitter circuits connected to be energized respectively from the D.C. power supply source and said time-delay circuit, said time-delay circuit including a resistor-capacitor combination of which the capacitor is charged through the resistor to provide a voltage output signal which is applied to control the base-emitter circuit to govern the state of the transistor in delayed response to changes in the energization of the time-delay circuit, and said electrical operating element being connected in an emitter circuit common to said collector-emitter and base-emitter circuits to be conditioned to trip the circuit interrupter in direct response to the emitter current, whereby to increase the input impedance of the base-emitter circuit and thereby prolong the time-delay provided by the resistor-capacitor combination.

2. An electrical power circuit time-over current protection system according to claim 1, wherein the electrical operating element of said relay means is the operating coil of a coil-operated contact system and is connected directly to the emitter of the transistor as an element common to both the collector-emitter and base-emitter circuits.

3. An electrical power circuit time-overcurrent protection system according to claim 1, wherein the electrical operating element is a resistor which is connected to govern the bias of the transistor, and wherein the relay means comprise a second transistor and include circuit connections with the first transistor and the circuit interrupter to form a trigger circuit operable to trip the circuit interrupter according to the conditions of said electrical operating element, which is connected in an emitter circuit common to both transistors and the collector-emitter and base-emitter circuits of said first transistor, said time-delay circuit providing a voltage output signal which is applied to control the base-emitter circuit of the first transistor to condition said electrical operating element to initiate a trigger action which promotes the tripping of the circuit interrupter in delayed response to changes in the energization of the time-delay circuit.

4. An electrical power circuit protection system according to claim 1, wherein short-circuiting means are provided for short-circuiting the capacitor in order to control the onset of a time-delay before relay operation and/or to facilitate the resetting of the system after relay operation, said short-circuiting means comprising a transistor which has its collector-emitter circuit connected across the capacitor whereby to discharge or prevent the build up of charge on the capacitor when its base-emitter circuit is suitably energized.

5. An electrical power circuit protection system according to claim 1, wherein the resistor capacitor combination of the time delay circuit includes a non-linear resistive element connected as part of the resistor-capacitor combination to cause the output signal applied to control the base-emitter circuit of the transistor to be a non-linear time-delayed function of an input signal of the time-delay circuit.

6. An electrical power circuit protection system according to claim 4, wherein the base-emitter circuit of the short-circuiting transistor includes voltage-biasing means and is connected to be energized through the rectifier from the alternating current circuit in a manner which assures that the capacitor cannot become charged unless the energizing signal derived from the alternating current circuit exceeds a predetermined level.

7. An electrical power circuit protection system according to claim 4, wherein said capacitor is connected to draw at least some of its charge from said D.C. supply source, whereby upon the removal of the short-circuit across the capacitor the time-delay before relay operation is limited by the voltage of the D.C. supply.

8. An electrical power circuit protection system according to claim 7, wherein a diode is connected to provide a charging path from the D.C. supply source to the capacitor, whereby to supplement any charge that the capacitor may receive directly from the protected alternating current circuit.

9. An electrical power circuit protection system comprising, in combination, a protected alternating current circuit, a transistor having a collector-emitter circuit connected to be energized from a D.C. supply source and a base-emitter circuit connected to be energized from said D.C. supply source or through a time-delay circuit according to a control exercized by circuit means for nullifying the action of the time-delay circuit, the time-delay circuit being itself energized through a rectifier from the alternating current source and including a resistor-capacitor combination itself energized through a rectifier from the alternating current circuit, said time-delay circuit including a reactive impedance element which is operative to delay the response of the transistor to changes in the energization of the time-delay circuit, and there being in said system relay means responsive to a current in the collector-emitter circuit for performing a protection operation in dependance upon the magnitude of the emitter current of the transistor and the level of energization of the protected alternating current circuit, being connected to be operated in direct and sole response to this emitter current when the energization of the protected alternating current circuit does not exceed a predetermined level and further connected to be operated in direct and sole response to this level of energization of the protected alternating current circuit when said predetermined level is exceeded.

10. An electrical power circuit protection system according to claim 9, wherein the time-delay nullifying means comprise a transistor by-pass stage which supplies an independent energization to the base-emitter circuit of the relay-operating transistor.

References Cited in the file of this patent

UNITED STATES PATENTS

| 2,815,446 | Coombs | Dec. 3, 1957 |
| 2,841,746 | Mawhinney | July 1, 1958 |
| 2,875,382 | Sandin et al. | Feb. 24, 1959 |

OTHER REFERENCES

Garner: Radio and Television News, October 1953, pp. 68–69.

UNITED STATES PATENT OFFICE
CERTIFICATE OF CORRECTION

Patent No. 2,977,510                          March 28, 1961

Colin Adamson et al.

It is hereby certified that error appears in the above numbered patent requiring correction and that the said Letters Patent should read as corrected below.

In the heading to the printed specification, between lines 6 and 7, insert the following:

Claims priority, application Great Britain September 17, 1956

Signed and sealed this 12th day of September 1961.

(SEAL)
Attest:

ERNEST W. SWIDER  
Attesting Officer

DAVID L. LADD  
Commissioner of Patents  
USCOMM-DC